United States Patent [19]

Verma et al.

[11] Patent Number: 6,004,475
[45] Date of Patent: *Dec. 21, 1999

[54] CORROSION INHIBITING SOLUTIONS FOR REFRIGERATION SYSTEMS COMPRISING HETEROPOLY COMPLEX ANIONS OF TRANSITION METAL ELEMENTS

[75] Inventors: Shyam Kumar Verma, Gastonia, N.C.; Manuel Sarkis Mekhjian, Fremont, Calif.; George Robert Sandor, Gastonia, N.C.; Philip John Boon, Wirral, United Kingdom; Yurii I. Kuznetsov; Sergey V. Oleinik, both of Moscow, Russian Federation

[73] Assignee: FMC Corporation, Philadelphia, Pa.

[*] Notice: This patent is subject to a terminal disclaimer.

[21] Appl. No.: 08/876,126

[22] Filed: Jun. 23, 1997

Related U.S. Application Data

[60] Provisional application No. 60/020,663, Jun. 27, 1996, and provisional application No. 60/022,293, Jul. 23, 1996.

[51] Int. Cl.$^6$ ............................ C09K 5/04; F25B 15/00
[52] U.S. Cl. ............................ 252/69; 252/67; 252/68; 62/112
[58] Field of Search .................. 252/68, 69, 67; 62/112

[56] References Cited

U.S. PATENT DOCUMENTS

| | | | |
|---|---|---|---|
| 3,227,518 | 1/1966 | Kennedy | 23/50 |
| 3,478,530 | 11/1969 | Aronson | 62/112 |
| 4,963,290 | 10/1990 | Bressan et al. | 252/387 |

FOREIGN PATENT DOCUMENTS

| | | |
|---|---|---|
| 0 248 346 | 12/1987 | European Pat. Off. . |
| 0 329 560 | 8/1989 | European Pat. Off. . |
| 0 611 388 | 8/1994 | European Pat. Off. . |
| 0 741 179 | 11/1996 | European Pat. Off. . |
| 2 505 861 | 11/1982 | France . |
| 58-224185 | 12/1983 | Japan . |
| 58-224187 | 12/1983 | Japan . |
| 59-93778 | 5/1984 | Japan . |
| 60-118785 | 6/1985 | Japan . |
| 1-184287 | 7/1989 | Japan . |
| 2-85655 | 3/1990 | Japan . |

OTHER PUBLICATIONS

Lomakina et al; "Heteropoly Anions as Corrosion Inhibitors for Aluminum in High Temperature Water", *Werkstoffe Und Korrosion*, vol. 46, No. 7, p. R111, 95–1230, XP000517821 (Jul. 1995).

Chemical Abstracts, vol. 94, No. 10, Mar. 1981, p. 245, abstract No. 69499c, H.P. Batroff et al., "Inhibition of pitting corrosion by heteropoly acids," *Ann. Univ. Ferrara, Sez. 5 Suppl.*, 1980, 7 (vol. 4, Eur. Symp. Corros. Inhibitors, 5th), pp. 1103–1110.

Japanese Patent Abstract 59117577, Jul. 1984.

C. Simpson, "Second Generation Corrosion Inhibitors", *Polymer Paint Colour J.*, 185(4371), pp. 23–24, Sep. 1995.

Japanese Patent Abstract 59200769, Nov. 1984.

L.V. Tumurova, E.V. Kvashnina and M.V. Mokhosoev, Zashch. Met. 26(3), 437–9 (1990) (abstract only), no month available.

D.M. Brasher et al., "Sodium *dodeca*Molybdophosphate as a Corrosion Inhibitor in Aqueous Solution", *Br. Corros. J.*, vol. 4, pp. 74–79, Mar. 1969.

A. Weisstuch et al., "An Electrochemical Study of Heteropoly Molybdates as Cooling Water Corrosion Inhibitors", *Corrosion–Nace*, vol. 28, No. 8, pp. 209–306, Aug. 1972.

Patent Abstracts of Japan vol. 007, No. 285 (C–201), Dec. 20, 1983 and JP 58 164792 A (Otsuka Kagaku Yakuhin KK) Sep. 29, 1983, no month available.

Pikel'nyi et al; "The Kinetics and Mechanism of Corrosion in the Presence of Heteropolycompounds", Protection of Metals, vol. 30. No. 4, p. 385/386 XP000466629, 1994.

Brasher et al, "Sodium dodeca–molybdophosphate as a Corrosion Inhibitor in Aqueous Solution", Br. Corros. J., vol. 4, pp. 74–79, Mar. 1969.

Chemical Abstracts, AN 121:25617, Pak et al, "Solid–phase Redox Reaction of 12th Series Heteropoly Acids", Zh. Fiz. Khim., 69(4), pp. 617–619, 1994, no month available.

Grant & Hackh's Chemical Dictionary, p. 282, definition of "heteropoly acids", 1987, no month available.

Simpson, "Second Generation Corrosion Inhibitors", Polymer Paint Colour J., 185(4371), pp. 23–24, Sep. 1995.

*Primary Examiner*—Christine Skane
*Attorney, Agent, or Firm*—Alston & Bird LLP

[57] ABSTRACT

Anticorrosion solutions useful for refrigeration processes are disclosed. Heteropoly complex anions of transitional metal elements can be added to alkali metal halide absorption refrigeration solutions to minimize corrosion of the refrigeration system.

25 Claims, 2 Drawing Sheets

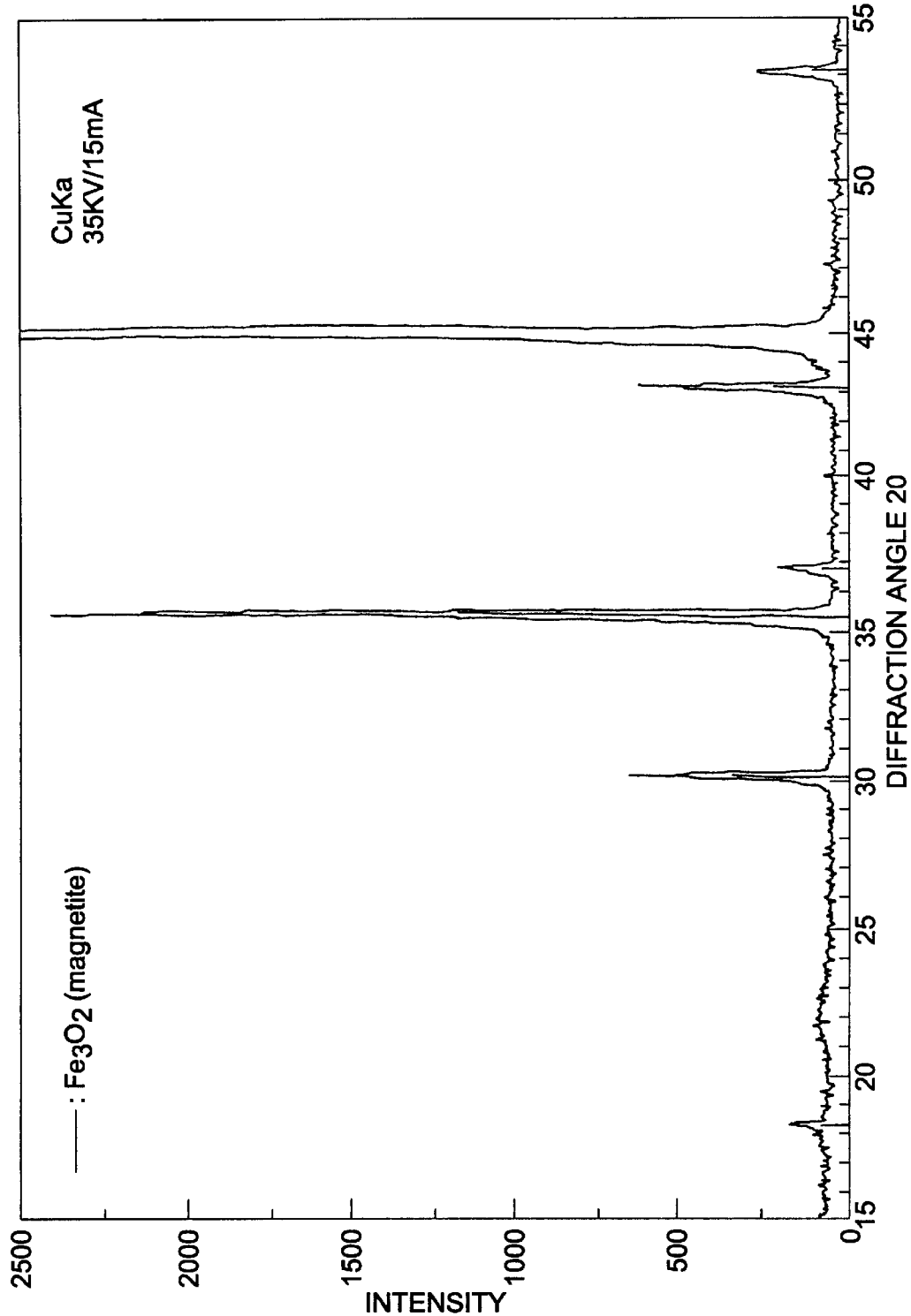

CORROSION INHIBITING SOLUTIONS FOR REFRIGERATION SYSTEMS COMPRISING HETEROPOLY COMPLEX ANIONS OF TRANSITION METAL ELEMENTS

CROSS REFERENCE TO RELATED APPLICATION

This application is related to commonly owned copending Provisional Application Ser. No. 60/020,663, filed Jun. 27, 1996, and copending Provisional Application Ser. No. 60/022,293, filed Jul. 23, 1996.

FIELD OF THE INVENTION

This invention relates generally to solutions for refrigeration systems, and in particular to absorption solutions which include corrosion inhibiting agents.

BACKGROUND OF THE INVENTION

Absorption refrigeration machines are widely used in commercial operations. A typical absorption refrigeration machine includes four major sections: absorber, generator, condenser, and evaporator.

In the absorber section, an absorbent fluid, typically an aqueous alkali metal halide solution, such as a lithium bromide solution, absorbs a refrigerant, typically water vapor. The absorber can be operated under sub-atmospheric pressure. The resultant weak or diluted absorbent fluid (about 40–58% concentration of alkali metal halide rich in the refrigerant) is pumped to the generator. Here heat is applied to the fluid to partially boil off the refrigerant to again concentrate the absorbent fluid. The concentrated absorbent solution (now about 63–65% alkali metal halide) from the generator is passed through a heat exchanger and then sprayed back into the absorber section where it resumes absorption of the refrigerant vapor.

The refrigerant vapor liberated in the generator migrates to the condenser where it is liquefied by exchanging heat with a cooling fluid (typically water) flowing through tubing (typically copper based alloy tubes) present in the condenser section. The liquid refrigerant in the condenser moves into the evaporator, which is also operated at an extremely low pressure. In the evaporator, the refrigerant cools the relatively warm system water circulating through the tubes of the tube bundle, and the chilled water is circulated to the load. Heat from the system water vaporizes the refrigerant water which then migrates to the absorber section for absorption into the concentrated solution and completes the cycle.

Aqueous alkali metal halide solutions are widely used as absorption fluids in commercial absorption refrigeration systems. An exemplary alkali metal halide solution for this application is a lithium bromide solution, adjusted to pH range of 7–13 with lithium hydroxide. Although this and other types of absorption solutions can be advantageous for the refrigeration cycles, alkali metal halides can be corrosive towards the materials used to construct the refrigeration machine. Such materials can include mild and stainless steel for containment components and copper or copper-nickel alloys for tube bundles, among others.

In addition to the surface damage caused by corrosion, the corrosion reaction evolves hydrogen gas as a byproduct. Incondensibles in the form of atoms or ions can easily enter and diffuse into metals, resulting in the degradation of their mechanical properties under certain system conditions.

The severity of corrosion can vary, depending upon factors such as temperature of the system, concentration of alkali metal halide in the absorption solution, metals used in the construction of the refrigeration unit, the presence of air, and the like. For example, during use, the internal temperatures of such machines can be high, typically up to about 450° F. and higher, depending on the type of the absorption cycle, which can increase the corrosive effect of the alkali metal halide solution.

Various additives, such as lithium chromate, lithium nitrate, and lithium molybdate, have been proposed as corrosion inhibitors in alkali metal halide absorption solutions. However, lithium chromate can raise environmental concerns, and its use is being phased out. Further, the level of chromate and its oxidation state must be carefully maintained. If too little chromate is used, then it does not properly passivate the whole metal surface and pitting can result. Lithium nitrate can potentially evolve ammonium, which can cause stress corrosion cracking of copper based alloys such as heat exchanger tubes. Lithium molybdate exhibits only limited solubility in alkali metal halide solutions. In addition, lithium molybdate is metastable in aqueous halide solutions and thus it can be difficult to maintain a constant concentration of molybdate ions in solution.

SUMMARY OF THE INVENTION

The present invention provides alkali metal halide solutions, preferably lithium halide solutions, and more preferably lithium bromide solutions, which are useful as absorption fluids in refrigeration machines. The absorption solutions of the invention contain heteropoly complex anions of transitional elements as a corrosion inhibition additive. Such complexes can be generally represented by the following formulas:

$$[X_a M_b O_c]^{-n},$$

$$[X_a Z_d M_b O_c]^{-n},$$

$$[X_a Z_d M_b O_c H_e]^{-n},$$

$$[X_a M_b O_c (OH)_f]^{-n},$$

and $$[X_a Z_d M_b O_c (OH)_f]^{-n},$$

wherein:

X and Z are central heteroatoms from Groups I–VIII of the Periodic Table of Elements;

the value of a varies and is 1 or 2;

the value of d varies and is an integer from 0 to 4;

$M_b O_c$, $M_b O_c H_e$, and $M_b O_c (OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

In a preferred embodiment of the invention, the transition metal M is molybdenum or tungsten, and more preferably molybdenum. A particularly preferred solution includes the heteropoly complex anion $[PMo_{12}O_{40}]^{-3}$.

The amount of heteropoly complex anion present in the solution can vary, depending upon various factors. Preferred amounts range from about 100 ppm to about 3000 ppm, more preferably about 200 ppm to about 300 ppm.

The solutions of the invention are more environmentally acceptable than lithium chromate solutions. The resultant solutions can also provide comparable and even improved corrosion inhibition as compared to solutions which include conventional corrosion inhibition additives. For example, the solutions of the invention can provide good anticorrosion benefits without pitting and severe crevice corrosion which can result for carbon steel at high temperatures using conventional corrosion inhibitors such as lithium chromate.

Still further, the heteropoly complex anions can exhibit improved solubility in alkali metal halide solutions, such as lithium bromide solutions, as compared to lithium molybdate, and accordingly the concentration of desired anticorrosion ions in solution can be increased. The heteropoly complex anions also are substantially stable in aqueous halide solutions, and thus the concentration of molybdate ions in solution can be more readily controlled.

Other advantages include reduced corrosion of the refrigeration machine, such as carbon steel, due to vapor phase, reduced amount of hydrogen generation and enhanced performance of the chillers, due to reduced accumulation of non-condensable gas in the absorber.

Still further, use of the absorption solutions on a refrigeration machine can result in a strongly textured (well developed, i.e., increased crystallinity) and protective layer of magnetite (iron oxide) formed on carbon steel. The inventors have found that oxide layers which form as a result of using the solutions of the invention can be more protective and textured than oxide layers formed in the presence of conventional corrosion inhibitors, such as lithium molybdate, in which magnetite films tend to be more amorphous and less developed.

BRIEF DESCRIPTION OF THE DRAWINGS

Some of the features and advantages of the invention having been described, others will become apparent from the detailed description which follows, and from the accompanying drawings, in which:

FIG. 2 is an x-ray diffraction pattern of a surface layer formed on carbon steel coupons exposed to a lithium molybdate (160 ppm)/LiBr solution at 400° F. for one week.

DETAILED DESCRIPTION OF THE INVENTION

Figure 1:
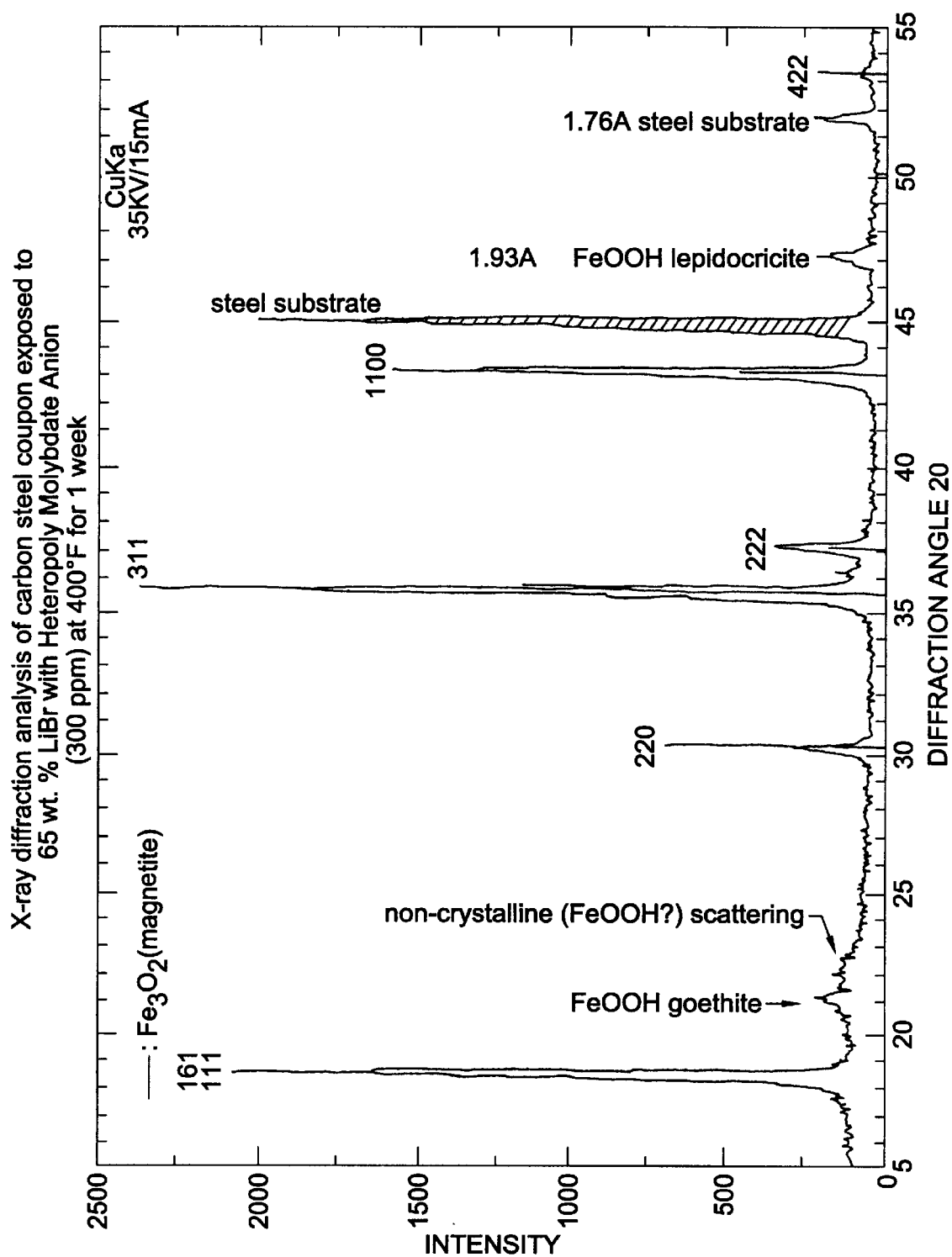
FIG. 1 is an x-ray diffraction pattern of a surface layer formed on carbon steel coupons exposed to a heteropoly molybdate anion (300 ppm)/LiBr solution at 400° F. for one week.

The heteropoly complex anions of transition metal elements useful as corrosion inhibiting agents in the absorption solutions of the invention can be generally described as coordination-type salts and free acids with a complex and high molecular weight anion. The heteropoly complex anions include as a ligand or complexing agent at least one transition metal atom which, as an ion in solution, exhibits corrosion inhibiting properties in absorption refrigeration systems. The heteropoly complex anions useful in the solutions of the invention also are preferably substantially completely soluble in alkali metal halide solutions, such as lithium bromide solutions, so as to maximize the concentration of the corrosion inhibiting ions in solution. The heteropoly anions contains complexed transition metal atoms (such as Mo). Therefore, the dissolved heteropoly anions can provide a higher level of transition metal anions (Mo anions) in a solution, as compared to simple transition metal oxides, such as molybdates like lithium molybdate.

Such complexes can be generally represented by the following formulas:

$[X_a M_b O_c]^{-n}$, $[X_a Z_d M_b O_c]^{-n}$, $[X_a Z_d M_b O_c H_e]^{-n}$, $[X_a M_b O_c (OH)_f]^{-n}$, and $[X_a Z_d M_b O_c (OH)_f]^{-n}$, wherein:

X and Z are central heteroatoms from Groups I–VIII of the Periodic Table of Elements;

the value of a varies and is 1 or 2;

the value of d varies and is an integer from 0 to 4;

$M_b O_c$, $M_b O_c H_e$, and $M_b O_c (OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the 0 atoms have been reported. Any of the various heteropoly complex anions known in the art can be used in the invention, including compounds described by G. A. Tsigdinos, Topics Curr. Chem., vol. 76, 5–64 (1978) and D. L. Kepert, Comprehensive Inorganic Chemistry (A. F. Trofman et al.) Oxford:Pergamon Press, vol. 4, pp. 607 (1973), the entire disclosure of each of which is incorporated herein by reference.

With regard to the central or heteroatom X, over 40 different elements (both metals and nonmetals) from Periodic Groups I–VIII can function as central atoms in distinct heteropoly complex anions. Exemplary central atoms include, but are not limited to, ions of phosphorus, silicon, manganese, arsenic, boron, iron, tellurium, copper, zinc, aluminum, tin, zirconium, titanium, vanadium, antimony, bismuth and chromium, and the like.

M is a 2–18 hexavalent transition metal element atom, which surrounds one or more central atoms X. The transition metal atom M is selected from those elements which as ions in solution provide corrosion inhibiting effect in absorption refrigeration systems. Preferably the transition metal element M in the oxoanion is derived from molybdate or tungstate. Other transition metal elements can also be present, as represented in the formula as Z, such as but not limited to, manganese, cobalt, nickel, copper, zinc, vanadium, niobium, tantalum and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$, and the like; silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M = 1:12, 1:11, 1:10, 1:9, 1:6, 2:10, 2:17, 2:5, 4:12, 1m:6m (m unknown) and 1:1 heteropoly complex anions. The known tungstates include all of the above in addition to 2:18, 2:17 and 2:4:18.

The heteropoly complex anions can be used singly or as mixtures with one another and/or with other corrosion inhibiting agents. The heteropoly complex anions are present in the absorption solutions in amounts sufficient to provide the desired corrosion inhibiting effect. This amount can vary depending upon various factors, such as the solubility of the heteropoly complex anions in the absorption solution, the nature of the ions of the heteropoly complex anions, temperatures of the environment of the refrigeration machine, concentration of the alkali metal halide solution, metals used in the construction of the refrigeration unit, the presence of air, and the like. Preferably, the absorption solutions of the invention include heteropoly complex anions in an amount ranging from about 100 parts per million (ppm) to about 3000 ppm, and more preferably from about 200 ppm to about 300 ppm. For example, concentrated lithium bromide solutions (65 weight percent) which include the heteropoly complex anion corrosion inhibiting agents compound in an amount of about 200 ppm to about 300 ppm can demonstrate excellent corrosion inhibition properties for carbon steel at temperatures up to 450° F. and higher.

The absorption solutions include alkali metal halide in conventional amounts. An exemplary alkali metal halide solution includes alkali metal halide in an amount from about 40 to about 65 weight percent, preferably about 50 to about 65 weight percent, based on the total weight of the solution. The alkali metal halide can be, for example, lithium halide, preferably lithium bromide, although the absorption solution can include other alkali metal halides, such as lithium chloride, lithium iodide, as well as mixtures of these. Still further, the absorption solution can include lithium nitrate. Still further, the absorption solution can include other halides, such as zinc halides, which are particularly useful in high temperature applications (generally about 450° F. and higher). The zinc halides can be present in amounts up to about 45 weight percent (for example, a solution comprising 45 wt. % zinc halide and 20 wt. % lithium bromide). For these formulations, the solution pH can be adjusted between 7–13 with lithium hydroxide.

As the skilled artisan will appreciate, the environment or conditions, such as temperature and/or pressure, of different refrigeration machines can vary. Typically, the temperature of the machine ranges from about 150° F. to about 500° F., although the temperature can be outside this range as well. The solutions of the invention are particularly advantageous in higher temperature applications.

The solutions of the invention can include mixtures of heteropoly anions with one another and/or with other corrosion inhibitors as known in the art in conventional amounts.

The present invention will be further illustrated by the following non-limiting examples.

EXAMPLE 1

Tests were performed in a pressure vessel autoclave with temperature control (+/−2° F.). A concentrated (65 wt. %) lithium bromide solution was prepared using anhydrous lithium bromide and deionized water. The alkalinity of each solution was adjusted with lithium hydroxide to control the solution pH at a level that optimized the performance of each chemical or generally accepted in the industry.

Sample solutions were prepared by adding phosphomolybdic acid, lithium chromate and lithium molybdate to the lithium bromide solution. Each of the above inhibitors was added individually to 800 ml lithium bromide solution. Pre-weighed metal coupons were placed in, and above the lithium bromide solution contained in a 2 liter cylinder made of Inconel-600 which fits into the autoclave. The cylinder containing the absorption solution and metal coupons was evacuated (to about 29.6 in of Hg) using a vacuum pump prior to starting the test. The solution was heated to a specified temperature and held at that temperature for a period of 72 hours.

Upon completion, the test coupons were removed and cleaned. The corrosion rate was calculated from the weight loss. The coupons were also tested by surface analysis. The results are set forth in Table 1 below.

TABLE 1

| | Corrosion Rate (mils per year) for Carbon Steel at | | | |
|---|---|---|---|---|
| Additive | 300° F. | 350° F. | 400° F. | 450° F. |
| None | 31 | 41 | 220 | 326 |
| PMA[1] (500 ppm), pH 6.5 | 6.2 | 11 | 21 | 33 |
| Lithium Chromate (0.27 wt. %), pH 9–10 | 9.8 | 14 | 19 | 47 |
| Lithium Molybdate (160 ppm), pH 11–12 | 28 | 64 | 38 | 43 |

[1]PMA is phosphomolybdic acid

EXAMPLE 2

Tests were performed as described above in Example 1, except that corrosion rates were evaluated for carbon steel coupons in 65 wt. % LiBr solution at temperatures from 300–450° F. for a period of 168 hours. Also different amounts of PMA at different pHs were also evaluated. The results are set forth in Table 2 below.

TABLE 2

| Additive | Corrosion Rate (mils per year) for Carbon Steel at | | | |
|---|---|---|---|---|
| | 300° F. | 350° F. | 400° F. | 450° F. |
| None | 25 | 60 | 118 | 132 |
| Lithium Molybdate (199 ppm), pH 11–13 | 9 | 10 | 12 | 14 |
| PMA (300 ppm), pH 11–13 | 2 | 2 | 5 | 8 |
| PMA (300 ppm), pH 7–8 | 3 | 5 | 27 | 49 |
| PMA (322 ppm) pH 5 | 6 | 10 | 25 | 43 |

Hydrogen generation was also calculated and is set forth below for carbon steel in 65 wt. % LiBr at 168 hours for various additives. These results are set forth in Table 3 below.

TABLE 3

| Additive | Hydrogen Generation (mg/in$^2$) for Carbon Steel at | | | |
|---|---|---|---|---|
| | 300° F. | 350° F. | 400° F. | 450° F. |
| None | 0.5 | 27 | 36 | 37 |
| Lithium Molybdate (199 ppm), pH 11–13 | 2.7 | 2.0 | 6.9 | 7.9 |
| PMA (300 ppm), pH 11–13 | 0.6 | 1.8 | 0.9 | 5.0 |
| PMA (300 ppm), pH 7–8 | 0.6 | 1.4 | 20 | 29 |
| PMA (322 ppm) pH 5 | 0.8 | 3.2 | 17 | 25 |

Surface analysis of the coupons exposed to the solutions was also conducted using X-ray diffraction of the surface layer. The measurements were carried out on a wide angle diffractometer using CuK radiation with a diffracted beam monochromator. FIG. 1 is an x-ray diffraction pattern of a surface layer formed on carbon steel coupons exposed to a PMA (300 ppm)/LiBr solution at 400° F. for one week. FIG. 2 is an x-ray diffraction pattern of a surface layer formed on carbon steel coupons exposed to a lithium molybdate (160 ppm)/LiBr solution at 400° F. for one week.

Both coupons show peaks that match well with the magnetite ($Fe_3O_4$) lines. However, the peaks at 161, 200, 222, and 400 are much stronger in the case of PMA, suggesting more stable magnetite. On the PMA exposed coupon peaks indicating the presence of some FeOOH (geothite and lepidocrocite) phases are also seen. These may be intermediate phases leading to the formation of more stable magnetite. No such phases were seen in the case of the coupon exposed to $Li_2MoO_4$/LiBr formulation. In this case, an increase in the background between 20–25° and 25° suggests the presence of a greater noncrystalline phase (about 15 volume percent of the coating).

The foregoing examples are illustrative of the present invention and are not to be construed as limiting thereof.

That which is claimed is:

1. An absorption solution for refrigeration systems, comprising at least one alkali metal halide in an amount of at least about 20 percent by weight based on the total weight of the solution and at least one heteropoly complex anion of a transition metal element in an amount sufficient to provide a corrosion inhibiting effect, said heteropoly complex anion comprising a compound selected from the consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:

X and Z are central heteroatoms selected from the group consisting of tellurium and elements of Groups IVB, VB, VIB, VIIB, VIIIB, IB, IIB, IIIA, IVA, and VA of the Periodic Table of Elements;

a is 1 or 2;

d is an integer from 0 to 4;

$M_bO_c$, $M_bH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and n is the charge of the anion.

2. The solution of claim 1, wherein

X is phosphorus, silicon, manganese, tellurium or arsenic.

3. The solution of claim 1, wherein said at least one heteropoly complex anion is selected from the group consisting of phosphomolybdates, silicon molybdates, manganese molybdates, silicon tungstates, tellurium molybdates, arsenic molybdates, and mixtures thereof.

4. The solution of claim 1, wherein said at least one heteropoly complex anion comprises a phosphomolybdate of the formula $[PMo_{12}O_{40}]^{-3}$.

5. The solution of claim 1, wherein said at least one heteropoly complex anion is present in an amount of 100 ppm to about 3000 ppm.

6. The solution of claim 1, wherein said at least one alkali metal halide is selected from the group consisting of lithium bromide, lithium chloride, lithium iodide and mixtures thereof.

7. The solution of claim 1, further comprising zinc halide.

8. The solution of claim 5, wherein said at least one heteropoly complex anion is present in an amount of about 100 ppm to about 500 ppm.

9. The solution of claim 1, wherein:

X is a central heteroatom selected from the group consisting of phosphorus, silicon, manganese, arsenic, boron, iron, tellurium, copper, zinc, aluminium, tin, zirconium, titanium, vanadium, antimony, bismuth, and chromium; and Z is a central heteroatom selected from the group consisting of magnanese, cobalt, nickel, copper, zinc, vanadium, niobiuin, and tantalum.

10. An absorption solution for refrigeration systems, comprising lithium halide in an amount of at least about 20 percent by weight based on the total weight of the solution and at least one phosphomolybdate in an amount sufficient to provide molybdenum ions in said solution in a corrosion inhibiting amount.

11. The solution of claim 10, wherein said at least one phosphomolybdate comprises a compound of the formula $[PMo_{12}O_{40}]^{-3}$.

12. A process for inhibiting the corrosion of a refrigeration machine resulting from the presence of alkali metal halide absorbent solutions, comprising circulating in a refrigeration machine an absorption solution comprising at least one alkali metal halide in an amount of at least about 20 percent by weight based on the total weight of the solution and at least one heteropoly complex anion of a transition metal element in an amount sufficient to provide a corrosion inhibiting effect, said heteropoly complex anion comprising a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixture thereof, wherein:

X and Z are central heteroatoms selected from the group consisting of tellurium and elements of Groups IVB, VB, VIB, VIIB, VIIIB, IB, IIB, IIIA, IVA, and VA of the Periodic Table of Elements;

a is 1 or 2;

d is an integer from 0 to 4;

$M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and n is the charge of the anion.

13. The process of claim 12, wherein

X is phosphorus, silicon, manganese, tellurium or arsenic.

14. The process of claim 12, wherein said at least one heteropoly complex anion is selected from the group consisting of phosphomolybdates, silicon molybdates, manganese molybdates, silicon tungstates, tellurium molybdates, arsenic molybdates, and mixtures thereof.

15. The process of claim 12, wherein said at least one heteropoly complex anion comprises a phosphomolybdate of the formula $[PMo_{12}O_{40}]^{-3}$.

16. The process of claim 12, wherein said at least one heteropoly complex anion is present in an amount of 100 ppm to about 3000 ppm.

17. The process of claim 12, wherein said at least one alkali metal halide is selected from the group consisting of lithium bromide, lithium chloride, lithium iodide and mixtures thereof.

18. The process of claim 12, wherein said solution further comprises zinc halide.

19. The process of claim 12, wherein said solution further comprises lithium nitrate.

20. The process of claim 12, wherein during said circulating step, said at least one heteropoly complex anion forms a protective layer of magnetite on a surface within said machine.

21. The process of claim 12, wherein during said circulating step said solution is exposed to temperatures ranging from about 150° F. to about 550° F.

22. The process of claim 16, wherein said at least one heteropoly complex anion is present in an amount of about 100 ppm to about 500 ppm.

23. The process of claim 12, wherein said at least one lithium halide is present in an amount of about 40 to about 65 percent by weight based on the total weight of the solution.

24. The process of claim 12, wherein:

X is a central heteroatom selected from the group consisting of phosphorus, silicon, manganese, arsenic, boron, iron, tellurium, copper, zinc, aluminum, tin, zirconium, titanium, vanadium, antimony, bismuth, and chromiumn; and Z is a central heteroatom selected from the group consisting of manganese, cobalt, nickel, copper, zinc, vanadium, niobium, and tantalum.

25. The solution of claim 1, wherein said at least one lithium halide is present in an amount of about 40 to about 65 percent by weight based on the total weight of the solution.

* * * * *

UNITED STATES PATENT AND TRADEMARK OFFICE
CERTIFICATE OF CORRECTION

PATENT NO. : 6,004,475
DATED : December 21, 1999
INVENTOR(S) : Verma, et al.

It is certified that error appears in the above-identified patent and that said Letters Patent is hereby corrected as shown below:

Column 8, line 3, after "the" insert --group--; line 13, "$M_bO_c, M_bHe$" should read --$M_bO_c, M_bO_cH_e$--.
Column 10, line 25, "chromiumn" should read --chromium--.

Signed and Sealed this

Twelfth Day of September, 2000

Attest:

Q. TODD DICKINSON

*Attesting Officer*      *Director of Patents and Trademarks*